United States Patent
Seaman et al.

(10) Patent No.: US 8,074,020 B2
(45) Date of Patent: Dec. 6, 2011

(54) ON-LINE VOLUME COALESCE OPERATION TO ENABLE ON-LINE STORAGE SUBSYSTEM VOLUME CONSOLIDATION

(75) Inventors: Mark James Seaman, San Jose, CA (US); Lu Nguyen, Tampa, FL (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 12/030,766

(22) Filed: Feb. 13, 2008

(65) Prior Publication Data

US 2009/0204759 A1 Aug. 13, 2009

(51) Int. Cl.
G06F 12/00 (2006.01)

(52) U.S. Cl. ............... 711/114; 711/165

(58) Field of Classification Search ........... 711/114, 711/165
See application file for complete search history.

(56) References Cited

U.S. PATENT DOCUMENTS

| | | | |
|---|---|---|---|
| 6,260,109 B1 * | 7/2001 | Ofer et al. ............ 711/112 |
| 7,155,501 B2 | 12/2006 | Mandal | |
| 7,594,074 B2 * | 9/2009 | Fujimoto et al. ............ 711/113 |
| 2002/0019907 A1 * | 2/2002 | McMurdie et al. ............ 711/112 |
| 2002/0103913 A1 | 8/2002 | Tawil | |
| 2004/0172501 A1 * | 9/2004 | Ukai et al. ............ 711/112 |
| 2004/0216131 A1 | 10/2004 | Robison | |
| 2005/0049848 A1 | 3/2005 | Dai | |
| 2005/0114595 A1 | 5/2005 | Karr | |
| 2006/0005074 A1 * | 1/2006 | Yanai et al. ............ 714/5 |
| 2007/0204119 A1 * | 8/2007 | Murotani et al. ............ 711/161 |
| 2007/0271434 A1 * | 11/2007 | Kawamura et al. ............ 711/165 |

* cited by examiner

*Primary Examiner* — Hashem Farrokh
(74) *Attorney, Agent, or Firm* — GSS Law Group

(57) ABSTRACT

A mechanism to permit consolidation of storage subsystem volumes into larger, more easily managed volumes and an operating system device driver which includes a trap mechanism for intercepting calls from a host into logical unit devices that were previously consolidated into a single physical volume. A map converts such calls to a logical unit device into a corresponding offset in the single physical volume. A driver accesses the single physical volume with corresponding offsets to transfer data associated with a particular logical unit device. So, logical unit devices can be consolidated and reconsolidated to single physical volumes and other physical volumes without requiring changes to the operating system or its application software and without requiring application or host downtime.

16 Claims, 2 Drawing Sheets six 8G byte LUN's six 8G byte LUN's one 48G+ byte LUN

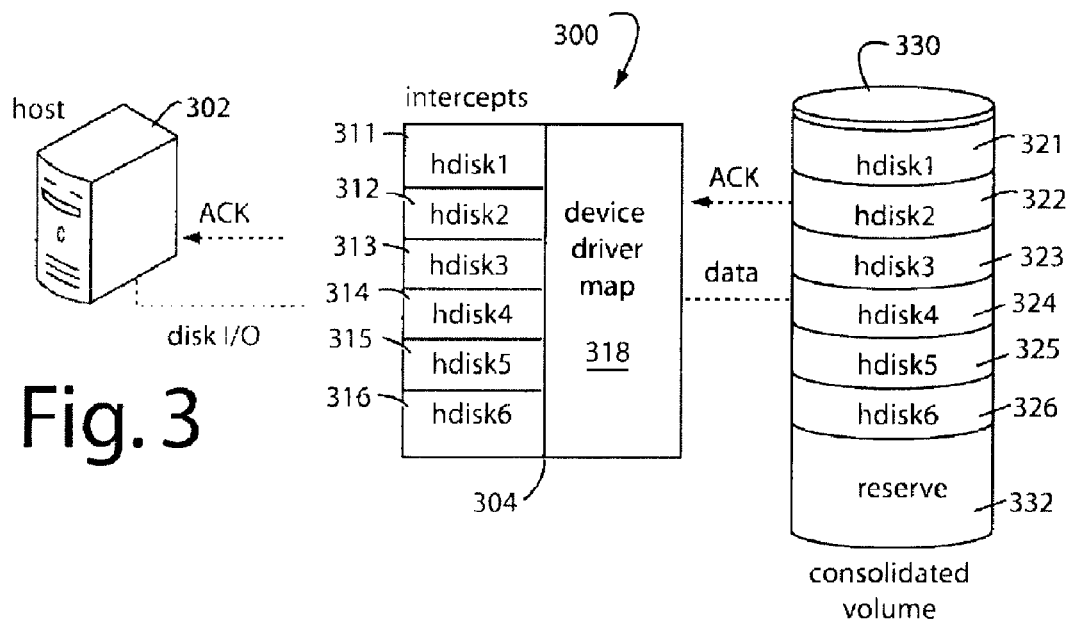
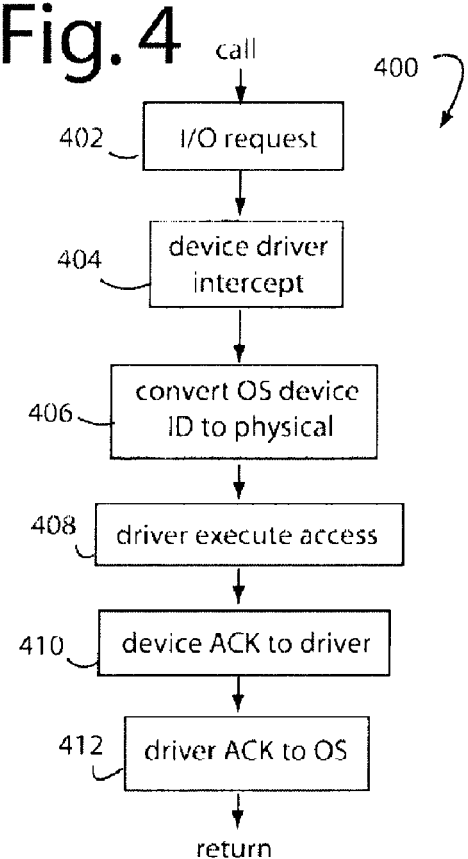
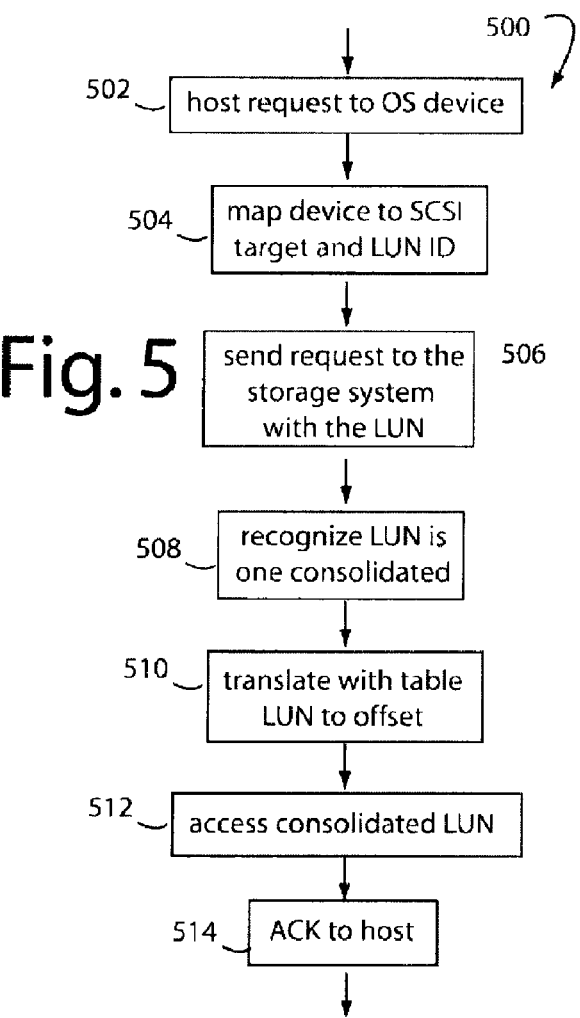

US 8,074,020 B2

ON-LINE VOLUME COALESCE OPERATION TO ENABLE ON-LINE STORAGE SUBSYSTEM VOLUME CONSOLIDATION

FIELD OF THE PRESENT INVENTION

The present invention relates to computer storage systems, and in particular to consolidating smaller logical unit devices into a large storage volume with minimal impact on the operating system and application software.

BACKGROUND

In computer storage, a logical unit (LUN) is an address for an individual disk drive and by extension, the disk device itself. The term is used in small computer systems interface (SCSI) protocol to differentiate individual disk drives within a common SCSI target device or disk array. LUN is a common term used in storage area networks (SAN) and other enterprise storage fields. LUN's are not usually used to describe individual disk drives, LUN more often refers to a virtual partition or volume of a RAID set.

Conventional enterprise storage subsystems are capable of storing many terabytes of data. Many users define a standard storage subsystem volume size and create many volumes of this size. Typically, the initial size is small, 8 GB, for example. As more storage is allocated the number of these small LUN's grows very quickly. For example, an IBM DS8000 with a capacity of 512 T byte could contain 48,000, 8G byte units. A very large number of storage subsystem volumes results in management complexity. Larger storage subsystem volumes may reduce management complexity to some extent. There is currently no way to resolve this problem, without an off-line conversion of the smaller volumes into larger ones, backup and restore of data from the server, and potential reconfiguration of all software and applications on the server. IBM's SAN Volume Controller (SVC) provides the ability to migrate storage extents (a multiple of blocks) between the "physical" storage subsystem disks it presents to the host operating system.

In SCSI, LUN's are addressed in conjunction with the controller ID of the host bus adapter, the target ID of the storage array, and an optional slice ID. In UNIX operating systems, such ID's are often combined, e.g., to refer to a controller, a target, a disk, and a slice, all in one word. EMC, Sun's Solaris operating system, Hewlett Packard's HP-UX, Hitachi Data Systems, NCR, and Teradata's MP-RAS use LUN slices, while IBM's AIX uses "hdiskN" to refer to a particular partition of a storage device.

Conventional storage volume consolidation processes require application downtime, and backup and restore of data. The prior art methods do not work while the system is on-line. Such prior art methods also require significant changes to the existing software or applications.

SUMMARY OF THE PRESENT INVENTION

A storage subsystem device driver for an operating system includes a trap mechanism for intercepting calls from a host with a computer operating system into logical unit devices that were previously consolidated into a single physical volume. A map converts such calls to a logical unit device into a corresponding offset in the consolidated single physical volume. A driver accesses the single physical volume with corresponding offsets to transfer data associated with a particular logical unit device. Logical unit devices can be consolidated and reconsolidated to single physical volumes and other physical volumes without requiring changes to the operating system or its application software.

The invention allows storage volumes, which are normally a combination of physical disks, to be consolidated into a single logical entity and easily managed by storage administrators.

A method is provided that allows storage administrators to freely select the storage volumes to be consolidated and to carry out the consolidation process.

Also provided is a method that can be executed without any downtime or system outage by maintaining a table which maps the original storage subsystem volumes to offsets in new single, consolidated volumes, thereby allowing I/O operations to the previous volumes to be transparently redirected to new consolidated volumes.

Also provided is a method by which a storage subsystem can notify affected hosts of storage configuration changes, thus allowing logical volume managers to change their internal storage mapping to access newly-created consolidated storage volumes.

The above summary of the present invention is not intended to represent each disclosed embodiment, or every aspect, of the present invention. Other aspects and example embodiments are provided in the figures and the detailed description that follow.

BRIEF DESCRIPTION OF THE DRAWINGS

The present invention may be more completely understood in consideration of the following detailed description of various embodiments of the present invention in connection with the accompanying drawings, in which:

FIG. 3 is a functional block diagram of a system embodiment of the present invention showing a device driver that intercepts calls to the smaller LUN's and redirects these to a single physical device with corresponding partitions;

FIG. 4 is a flowchart diagram of a method embodiment of the present invention showing the steps the device driver of FIG. 3 takes to redirect calls to the six smaller LUN's to the consolidated single physical device; and FIG. 5 is a flowchart diagram of a SCSI method embodiment of the present invention showing the steps the systems of FIGS. 1-3 could use to redirect calls for the six smaller LUN's to the consolidated single physical device.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
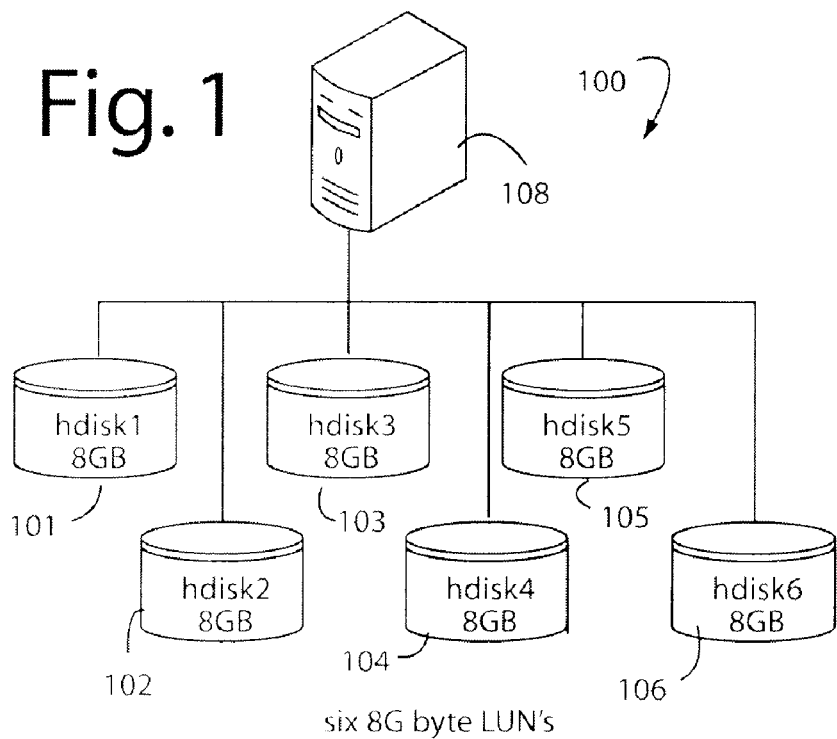
FIG. 1 is a functional block diagram of a system embodiment of the present invention showing six smaller LUN's before being consolidated onto a single physical device.

In FIG. 1, a storage server-A 100 is initially configured to have six 8 G byte logical units (LUN's) 101-106 that can accessed by a computer 108, e.g., as AIX operating system devices "hdisk1" through "hdisk6". These LUN's may be used to create a logical volume manager (LVM) volume group. The logical volumes can then be allocated from the volume group on which file systems were created. Relational database management systems (RDBMS) could use the LUN's 101-106 as raw physical volumes. The device name is associated with the storage subsystem volume, and all access is by the device name.

Figure 2:
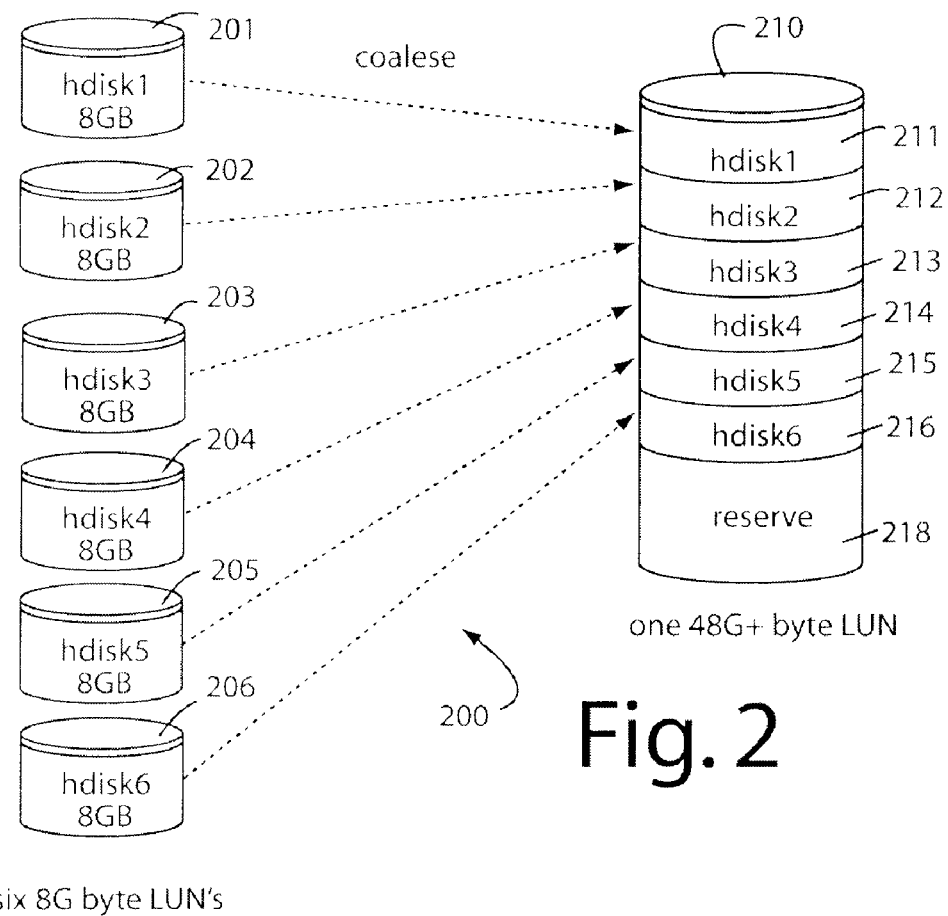
FIG. 2 is a diagram representing how the six smaller LUN's of FIG. 1 could be consolidated into a single storage subsystem volume device.

In FIG. 2, a storage administrator may decide later, for example, that a single 48 G byte volume would have been a better way to configure storage 100. So, embodiments of the present invention provide an administrative interface for coalescing, e.g., six smaller LUN's 201-206 onto a single 48 G byte volume 210. Relocated as hdisk1-hdisk6 devices 211-216.

One embodiment of a method consolidates smaller logical volumes into a large physical volume of an appropriate size. For each volume to be consolidated, an offset into the new volume, e.g., LUN 210, is determined for current volumes 201-206. The blocks of storage are copied one at a time from each current volume hdisk1-hdisk6 devices 201-206, into the corresponding partitions hdisk1-hdisk6 partitions 211-216, on consolidated volume 210. Such steps are repeated until all the blocks of all the original volumes have been coalesced into the new volume 210. If a device discovery process were run after this operation, only the single LUN 210 would be discovered. Applications that formerly accessed volumes using hdisk1-hdisk6 devices 201-206 would now fail.

In one embodiment a device driver is used to map previous device names to the offset within the newly created LUN. In FIG. 3, a system 300 has a host computer 302 that requests storage access from hdisk1-hdisk6. A device driver 304 intercepts these requests with traps 311-316. A device driver map 318 directs these logical requests to a corresponding partition 321-326 on a large physical volume 330. An unused partition 332 may be left over for future assignment. The device driver map 318 can be remapped by a storage administrator to allow logical unit devices 311-316 to be consolidated and reconsolidated to the single physical volume 330, and other physical volumes, without requiring changes to the operating system or its application software on host 302.

FIG. 4 illustrates a device driver, referred to herein by the general reference numeral 400. Such is preceded by an earlier consolidation, or a consolidated large physical volume that may need to be reconsolidated or a storage system that may need to be reorganized with a different mix of physical drives later.

Input/Output (I/O) requests from a host to a consolidated volume are mapped by a device driver to an offset into the newly created volume. In a step 402, the application issues an I/O read or write request, e.g., to any of hdisk1-hdisk6. The device driver intercepts the I/O, in a step 404. The device driver, in a step 406, converts the operating system device ID to an appropriate physical location, e.g., as in Table-I.

TABLE I

| OS device ID | physical location |
| --- | --- |
| hdisk 1 | LUN 310 partition-1 |
| hdisk 2 | LUN 310 partition-2 |
| hdisk 3 | LUN 310 partition-3 |
| hdisk 4 | LUN 310 partition-4 |
| hdisk 5 | LUN 310 partition-5 |
| hdisk 6 | LUN 310 partition-6 |

The device driver, e.g., 304, executes access to the appropriate location, in a step 408. In a step 410, the device driver receives an indication of success, such as an acknowledgment (ACK), from the storage subsystem. The device driver returns success, e.g., ACK, to the application in a step 412.

Table-II illustrates how the map in Table-I could be adjusted to accommodate a change in the consolidation volumes, e.g., two physical volumes (LUN A and B) instead of one. The operating system would be unaffected by such change, because it can continue to use OS device ID's "hdisk1" thru "hdisk6".

TABLE II

| OS device ID | physical location |
| --- | --- |
| hdisk 1 | LUN A partition-1 |
| hdisk 2 | LUN A partition-2 |
| hdisk 3 | LUN A partition-3 |
| hdisk 4 | LUN B partition-1 |
| hdisk 5 | LUN B partition-2 |
| hdisk 6 | LUN B partition-3 |

In an alternative to a device driver approach, the storage subsystem could perform the consolidation and redirect host requests for the original LUN ID to the offset into the consolidated LUN. After consolidation, a method 500 in FIG. 5 can be used during run-time. In a step 502, the host requests access from a OS device using a device ID. The device ID is mapped to a SCSI target and a LUN ID in a disk device driver, in a step 504. In a step 506, a request is sent to the storage subsystem that includes such LUN. In a step 508, the storage subsystem recognizes that the LUN ID is one that has been consolidated. Using a translation table, in a step 510, the previous LUN and block offset are converted into an offset in the consolidated LUN. Data is accessed from the consolidated LUN, in a step 512. A step 514 transfers the data to the host. Such method has the advantage of not requiring any changes at the host level and reduces the number of modifications required by users.

In addition to device drivers on the host and code running in the storage subsystem, the invention can be implemented as a part of any firmware in a storage adapter installed in a host, or as part of an operating system that includes logical volume managers and file systems.

While the present invention has been described with reference to several particular example embodiments, those skilled in the art will recognize that many changes may be made thereto without departing from the spirit and scope of the present invention, which is set forth in the following claims.

The invention claimed is:

1. A storage subsystem, comprising:
a consolidation volume for storing data related to a plurality of logical unit (LUN) devices corresponding to separate physical devices accessed by a host and operating system according to device-ID'S, wherein each has an offset location within the consolidation volume;
a trap mechanism for intercepting calls by said device-ID'S from said host and operating system;
a map to convert said calls to a LUN device into a corresponding offset in the consolidation volume;
a driver for accessing the consolidated volume with said corresponding offset to transfer data associated with a particular LUN device;
a mechanism for consolidating and redirecting host requests for an original LUN ID into an offset to a consolidated LUN;
a device ID for host requests access from a OS device;
a mapping device ID to a SCSI target and a LUN ID in a disk device driver;
a request for sending to a storage subsystem that includes a LUN; and a device for recognizing that said LUN ID is one that was previously consolidated, wherein, said LUN devices can be consolidated and reconsolidated to a single physical volume and other physical volumes without requiring changes to said operating system or application software.

2. A storage subsystem, comprising:

devices to enable storage administrators to select storage volumes to be consolidated and consolidate the selected storage volumes into a single logical entity without causing any downtime or system outage by maintaining a table which maps original storage subsystem volumes to offsets into new single, consolidated volumes, thereby allowing I/O operations to previous volumes to be redirected to new consolidated volumes;

a consolidation volume for storing data related to a plurality of logical unit (LUN) devices corresponding to separate physical devices accessed by a host and operating system according to device-ID'S, wherein each has an offset location within the consolidation volume;

a trap mechanism for intercepting calls by said device-ID'S from said host and operating system;

a map to convert said calls to a LUN device into a corresponding offset in the consolidated volume; and a driver for accessing the consolidated volume with said corresponding offset to transfer data associated with a particular LUN device, wherein, during a migration process, the storage subsystem keeps track of the migration of storage extents and will respond host VO requests from the appropriate device, and said LUN devices can be consolidated and reconsolidated to a single physical volume and other physical volumes without requiring changes to said operating system or application software.

3. A storage subsystem, comprising:

a subsystem that can notify affected hosts of storage configuration changes thereby allowing logical volume managers to change their internal storage mapping to access any newly created consolidated storage volumes;

a consolidation volume for storing data related to a plurality of logical unit (LUN) devices corresponding to separate physical devices accessed by a host and operating system according to device-ID'S, wherein each has an offset location within the consolidation volume;

a trap mechanism for intercepting calls by said device-ID'S from said host and operating system;

a map to convert said calls to a LUN device into a corresponding offset in the consolidated volume; and a driver for accessing the consolidated volume with said corresponding offset to transfer data associated with a particular LUN device, wherein, host storage administration is substantially simplified, and said LUN devices can be consolidated and reconsolidated to a single physical volume and other physical volumes without requiring changes to said operating system or application software.

4. A storage subsystem method, comprising:

originally organizing memory storage into several relatively smaller LUN's which a particular operating system or application software references;

consolidating data recorded in said relatively smaller LUN's into a single consolidated volume, wherein each said LUN has a partition and offset address within;

mapping device calls to said LUN's to said partition and offset addresses; and notifying affected hosts of storage configuration changes thereby allowing logical volume managers to change their internal storage mapping to access any newly created consolidated storage volumes, wherein, during run-time said operating system or application software can continue to use said device calls to said LUN's because they will be redirected by the mapping to a corresponding partition and offset address within said consolidated volume.

5. The method of claim 4, further comprising:

reconsolidating data recorded in said consolidated volume which has a partition and offset address within corresponding to said relatively smaller LUN's, to another reconsolidation volume in which said relatively smaller LUN's now have a new a partition and offset address within the partition.

6. The method of claim 5, further comprising:

remapping said relatively smaller LUN's to said new partition and offset address within said reconsolidation volume;

wherein, said particular operating system or application software can continue to operate without modification caused by said reconsolidating.

7. A storage subsystem method, comprising:

mapping device calls to LUN's referenced in a particular operating system or application software requests to corresponding partition and offset addresses in a consolidation volume; and notifying affected hosts of storage configuration changes thereby allowing logical volume managers to change their internal storage mapping to access any newly created consolidated storage volumes, wherein, said LUN's correspond to separate physical devices and during run-time said operating system or application software can continue to use said device calls to said LUN's because they will be redirected by the mapping to a corresponding partition and offset address within said consolidated volume.

8. The method of claim 7, further comprising preliminary steps of:

originally organizing memory storage into several relatively smaller LUN's which a particular operating system or application software references;

consolidating data recorded in said relatively smaller LUN's into said consolidated volume, wherein each said LUN has a partition and offset address within.

9. The method of claim 7, further comprising:

reconsolidating data recorded in said consolidated volume which has a partition and offset address within corresponding to said relatively smaller LUN's, to another reconsolidation volume in which said relatively smaller LUN's now have a new a partition and offset address within.

10. The method of claim 4, further comprising:

remapping said relatively smaller LUN's to said new partition and offset address within said reconsolidation volume;

wherein, said particular operating system or application software can continue to operate without modification caused by said reconsolidating.

11. The method of claim 7, further comprising:

using a translation table to convert a previous LUN ID and block offset into an offset in said consolidated volume.

12. The method of claim 7, further comprising:

consolidating and redirecting host requests for an original LUN ID into an offset to a consolidated LUN;

using a device ID for host requests access from a OS device;

mapping device ID to a SCSI target and a LUN ID in a disk device driver;

sending a request to a storage subsystem that includes a LUN; and recognizing that said LUN ID is one that was previously consolidated.

13. The method of claim 7, wherein storage volumes comprising a combination of physical disks can be consolidated into a single logical entity and managed by a storage administrator.

14. The method of claim 7, wherein storage administrators are enabled to select storage volumes to be consolidated and consolidate the selected storage volumes into a single logical entity.

15. The method of claim 7, wherein storage administrators are enabled to select storage volumes to be consolidated and consolidate the selected storage volumes into a single logical entity without causing any downtime or system outage by maintaining a table which maps original storage subsystem volumes to offsets into new single, consolidated volumes, thereby allowing I/O operations to previous volumes to be redirected to new consolidated volumes.

16. The method of claim 7, wherein a storage subsystem can notify affected hosts of storage configuration changes thereby allowing logical volume managers to change their internal storage mapping to access any newly-created consolidated storage volumes.

* * * * *